(12) United States Patent
Pollack et al.

(10) Patent No.: US 10,260,290 B2
(45) Date of Patent: Apr. 16, 2019

(54) CONNECTOR FOR STEEL CATENARY RISERS

(71) Applicant: SINGLE BUOY MOORINGS, INC., Marly (CH)

(72) Inventors: Jack Pollack, Camarillo, CA (US); Alpha Mahatvaraj, Sugar Land, TX (US)

(73) Assignee: SINGLE BUOY MOORINGS, INC., Marly (CH)

( * ) Notice: Subject to any disclaimer, the term of this patent is extended or adjusted under 35 U.S.C. 154(b) by 0 days.

(21) Appl. No.: 15/787,419

(22) Filed: Oct. 18, 2017

(65) Prior Publication Data
US 2018/0106115 A1 Apr. 19, 2018

Related U.S. Application Data

(60) Provisional application No. 62/409,478, filed on Oct. 18, 2016.

(51) Int. Cl.
*E21B 17/042* (2006.01)
*F16L 15/00* (2006.01)
(Continued)

(52) U.S. Cl.
CPC .......... *E21B 17/042* (2013.01); *E21B 17/015* (2013.01); *E21B 17/085* (2013.01); *F16L 1/15* (2013.01); *F16L 15/004* (2013.01)

(58) Field of Classification Search
CPC .... E21B 17/042; E21B 17/085; E21B 17/015; F16L 15/004; F16L 1/15
See application file for complete search history.

(56) References Cited

U.S. PATENT DOCUMENTS 3,015,500 A 12/1955 Barnett
4,298,221 A 11/1981 McGugan
(Continued)

FOREIGN PATENT DOCUMENTS

CN 201037382 3/2008
CN 201714314 1/2011
(Continued)

OTHER PUBLICATIONS

The International Search Report and the Written Opinion of the International Searching Authority, dated Jan. 4, 2018, 9 pages.

*Primary Examiner* — Matthew R Buck
(74) *Attorney, Agent, or Firm* — Young & Thompson

(57) ABSTRACT

Methods that may be employed to help to equalize the length of the teeth on a pin-and-box SCR connector during make-up include locating the make-up groove on the box at the far box end away from the pipe end. This causes the make-up force to tension and stretch the box to make it longer. Additionally or alternatively placing grease or other fluid in the nib groove creates a resistance force to nib entry. The grease or fluid exits through a nib vent port in the box while creating a resistance that compresses the pin and stretches the box causing the tooth spacing of the pin and the box to be similar. Providing a ring groove at both ends of the box allows a tensioning device to be used to tension the box causing box elongation, which equalizes the tooth length of pin and box members during connector make up.

14 Claims, 4 Drawing Sheets

(51) Int. Cl.
*E21B 17/01* (2006.01)
*E21B 17/08* (2006.01)
*F16L 1/15* (2006.01)

(56) References Cited

U.S. PATENT DOCUMENTS

| | | | | |
|---|---|---|---|---|
| 4,648,627 | A | * | 3/1987 | Reimert .................. E21B 17/04 285/24 |
| 5,954,374 | A | * | 9/1999 | Gallagher ............. E21B 17/046 285/332 |
| 6,056,324 | A | | 5/2000 | Reimert et al. |
| 6,106,024 | A | * | 8/2000 | Herman ................ E21B 17/085 285/18 |
| 7,107,663 | B2 | | 9/2006 | Ellington et al. |
| 7,344,162 | B2 | * | 3/2008 | Van Bilderbeek .... E21B 17/085 285/331 |
| 7,614,453 | B2 | | 11/2009 | Spiering et al. |
| 8,672,366 | B2 | | 3/2014 | Mogedal et al. |
| 8,757,671 | B2 | * | 6/2014 | Pallini, Jr. ............. E21B 17/043 285/322 |
| 9,255,453 | B1 | * | 2/2016 | Jennings ................ E21B 17/085 |
| 2003/0075924 | A1 | * | 4/2003 | Olivier .................. E21B 17/042 285/331 |
| 2006/0065406 | A1 | | 3/2006 | Shuster et al. |
| 2007/0063517 | A1 | | 3/2007 | Pallini, Jr. et al. |
| 2011/0227338 | A1 | * | 9/2011 | Pollack .................. F16L 15/004 285/355 |
| 2013/0033035 | A1 | * | 2/2013 | Gallagher ................ D05B 3/02 285/332.2 |
| 2014/0265320 | A1 | * | 9/2014 | Pollack ................. E21B 17/042 285/334 |

FOREIGN PATENT DOCUMENTS

| | | |
|---|---|---|
| GB | 2099529 A | 12/1982 |
| GB | 2436931 A | 10/2007 |
| WO | 2005021922 A2 | 3/2005 |
| WO | 2009156708 A2 | 12/2009 |
| WO | 2013115649 A1 | 8/2013 |
| WO | 2014152842 A2 | 9/2014 |
| WO | 2016040863 A1 | 3/2016 |

* cited by examiner

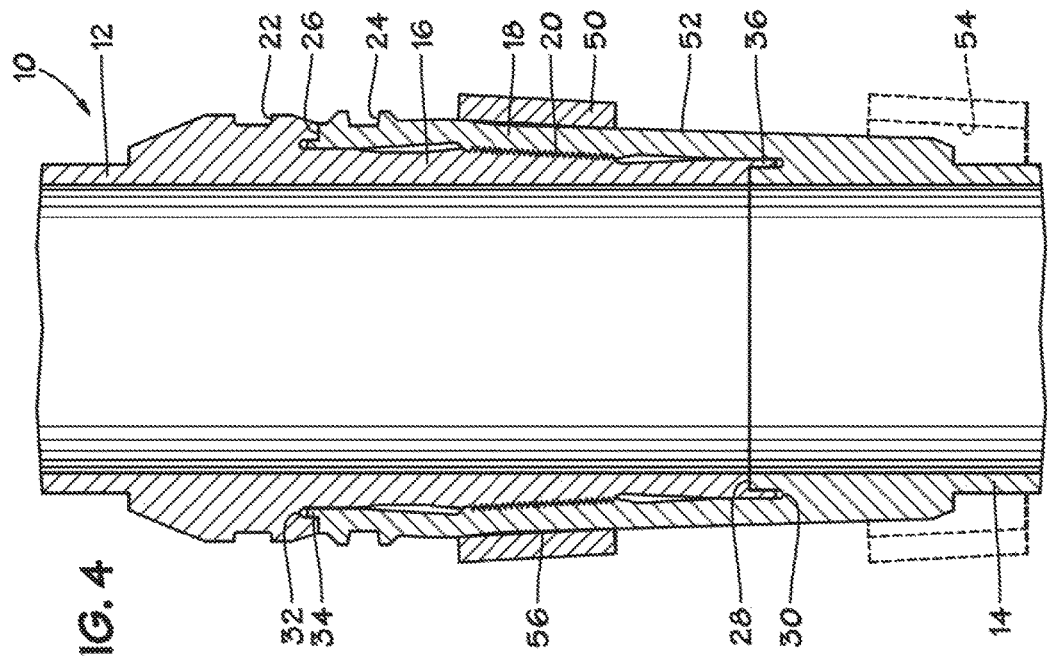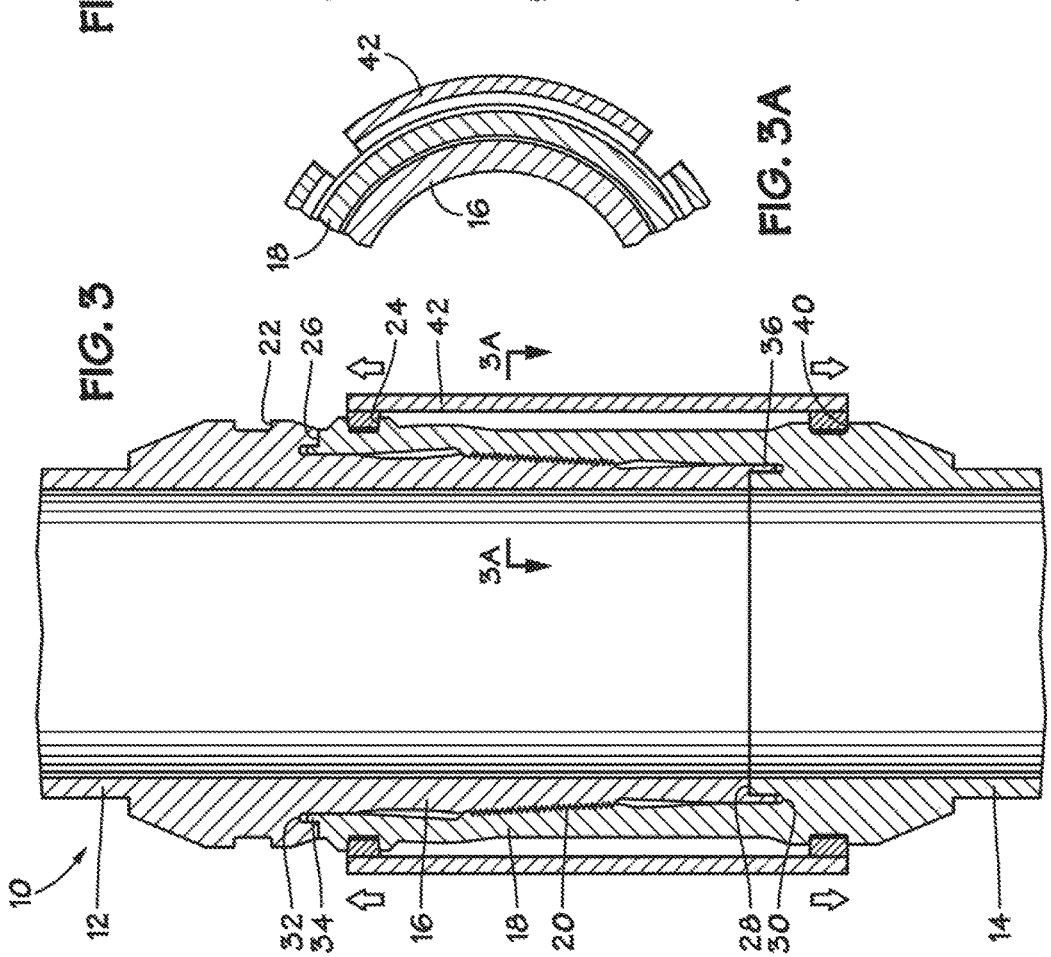

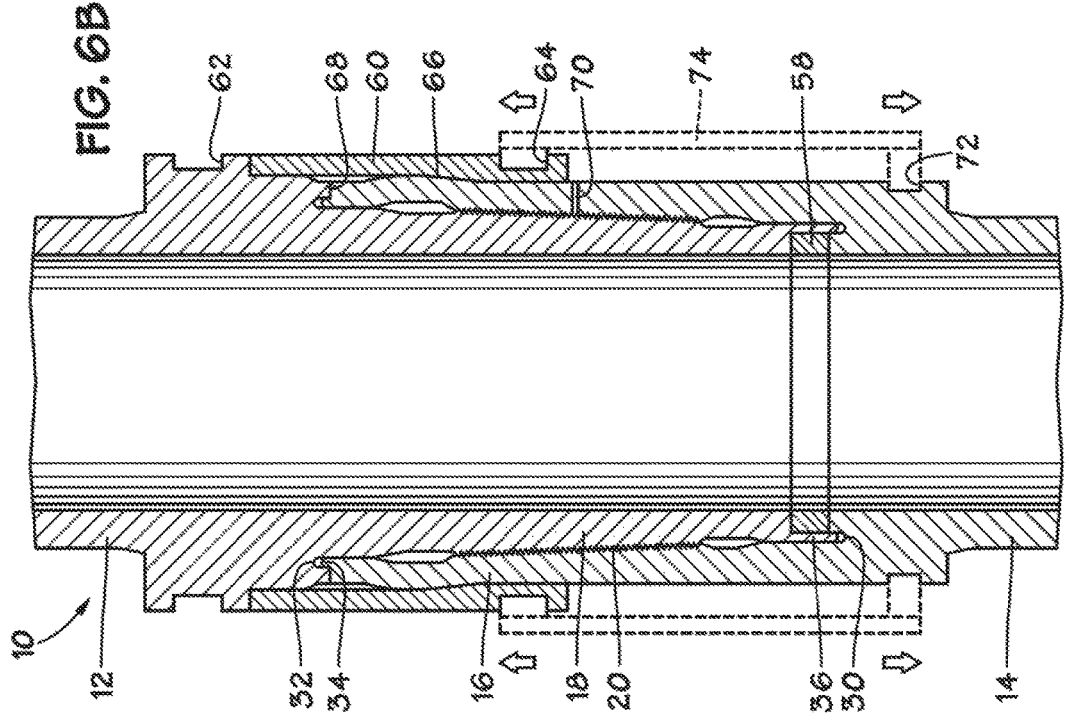
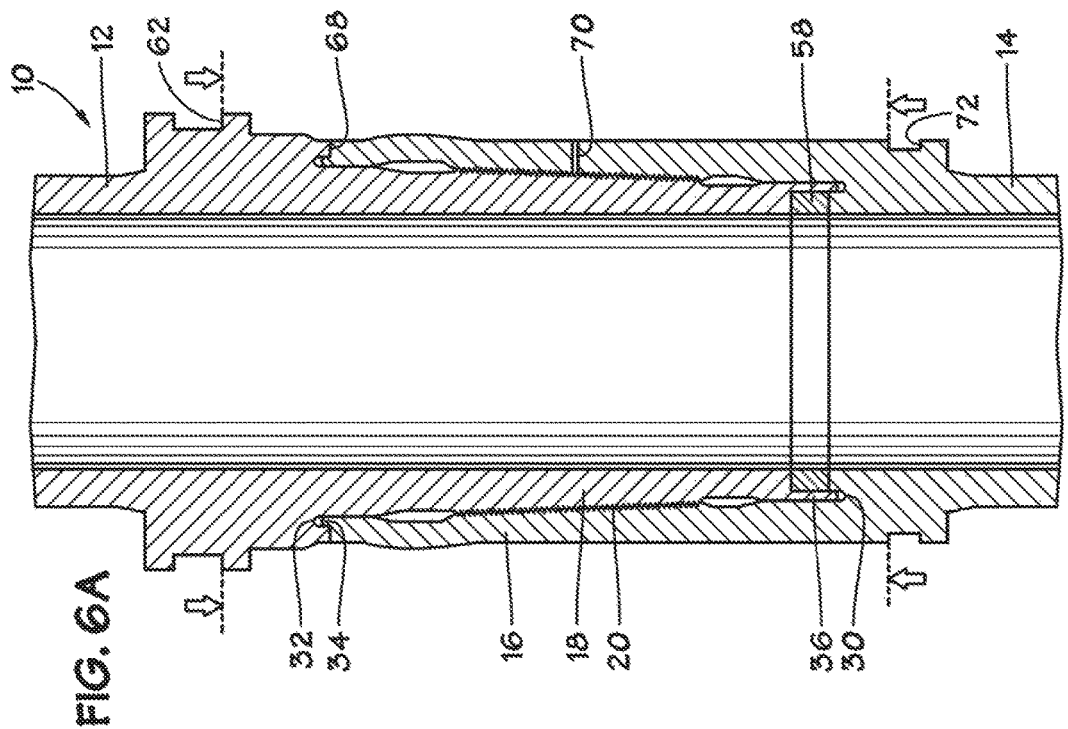

CONNECTOR FOR STEEL CATENARY RISERS

CROSS-REFERENCE TO RELATED APPLICATIONS

This application claims the benefit of U.S. Provisional Patent Application No. 62/409,478 filed on Oct. 18, 2016, the contents of which are hereby incorporated by reference in their entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to pipe connectors. More particularly, it relates to connectors having high-pressure, tension, and bending requirements such as those for use in Steel Catenary Risers.

2. Description of the Related Art Including Information Disclosed Under 37 CFR 1.97 and 1.98

A Steel Catenary Riser (SCR) is a steel pipe hung in a catenary configuration from a floating vessel in deep water to transmit flow to or from the seafloor.

SCR's are used in a common method of connecting a subsea pipeline to a deep-water floating or fixed oil production platform. SCR's are used to transfer fluids like oil, gas, injection water, etc. between a platform and a subsea pipeline.

In the offshore oil and gas industry, the word "catenary" is used as an adjective or noun with a meaning broader than its historical meaning in mathematics. Thus, an SCR that uses a rigid, steel pipe that has a considerable bending stiffness is described as a catenary. That is because, in the scale of ocean depths, the bending stiffness of a rigid pipe has little effect on the shape of the suspended span of an SCR. The shape assumed by the SCR is controlled mainly by its weight, buoyancy and hydrodynamic forces due to currents and waves. Thus, in spite of using conventional, rigid, steel pipe, the shape of an SCR may be closely approximated using equations for an ideal catenary.

The rigid pipe of the SCR forms a catenary between its hang-off point on the floating or rigid platform, and the seabed. A free-hanging SCR assumes a shape roughly similar to the letter J. The catenary of a "lazy wave SCR" consists of at least three catenary segments. The top segment and the seabed segment have negative submerged weight, and their curvatures "bulge" towards the seabed. The middle segment has buoyant material attached thereto such that the segment is positively buoyant. Accordingly, the curvature of the buoyant segment "bulges" upwards (inverted catenary), and its shape may also be well approximated with the same ideal catenary equations.

The SCR pipe and a short segment of pipe lying on the seabed use "dynamic" pipe, i.e. steel pipe having slightly greater wall thickness than the nominal pipeline wall thickness in order to sustain dynamic bending and to compensate for the material fatigue associated with the steel in the touch-down zone of the SCR. SCR's are typically 4-12 inches in diameter and operate at a pressure of 2000-15,000 psi. Designs beyond those ranges of pipe sizes and operating pressures are also feasible.

There are presently no mechanical means for coupling smaller SCRs. A larger 20-inch SCR connector has been qualified for offshore use. This connector uses parallel, coaxial threads as opposed to the more commonly used helical threads. Certain larger parallel thread connectors for TLP use and a smaller 12-inch connector for use as a riser in ocean mining have been built. There are no existing designs for smaller SCR connectors. Helically machined connectors might be feasible for this SCR use; however, none have so far been proposed. These connectors would not have a problem with make-up as the threads do not have to be forced over one another, as is the case with coaxial, parallel threads. However, a potential problem for helical connectors is that they might unscrew, as it is possible that very high torques may be present in SCRs when they are J-laid.

The design of a small SCR connector for deep water and high pressures is difficult because very little strain is available to allow the pin and box to be sufficiently expanded for the teeth to make-up and properly engage.

Using the methods of the prior art, it is not possible to produce an SCR connector capable of withstanding the full range of desired depths and pressures.

Poisson's ratio, also known as the coefficient of expansion on the transverse axial, is the negative ratio of transverse to axial strain. When a material is compressed in one direction, it usually tends to expand in the other two directions perpendicular to the direction of compression. This phenomenon is called the Poisson effect. Poisson's ratio v (nu) is a measure of this effect. The Poisson ratio is the fraction (or percent) of expansion divided by the fraction (or percent) of compression, for small values of these changes.

Conversely, if the material is stretched rather than compressed, it usually tends to contract in the directions transverse to the direction of stretching. It is a common observation when a rubber band is stretched, it becomes noticeably thinner. Again, the Poisson ratio will be the ratio of relative contraction to relative expansion and will have the same value as above. In certain rare cases, a material will actually shrink in the transverse direction when compressed (or expand when stretched) which will yield a negative value of the Poisson ratio.

The Poisson effect can cause a misalignment between the teeth of the pin and box members of a connector when they are forced together.

The apparatus and methods disclosed herein allow for the make-up and use of a small diameter, coaxial, parallel tooth, SCR connector for pressures and depths not capable with the conventional means of building these connectors.

BRIEF SUMMARY OF THE INVENTION

The present invention relates to a coaxial parallel-thread connector that is designed to be made-up by forcing the coaxial threads over each other until a position is reached where the tooth geometry matches and they engage. To minimize the high stresses that may occur as the teeth are forced over each other, a system of using a pressurized fluid between the teeth to minimize the contact pressure may be used. There exist a variety of patents on this type of connector describing numerous improvements. The present invention is focused on a problem of reducing tooth contact stresses during or after engagement, which worsens as the connector diameter decreases and the demands of tension, bending and pressure require coupling heavy-wall pipes.

Two novel methods are described herein to minimize these stresses occurring on one or more of the connector teeth during or after this engagement process. These methods involve:
 a. Keeping the tooth spacing of the inner and outer teeth more constant so that when tooth engagement occurs all teeth engage to a similar depth; and,
 b. Increasing or maintaining tooth engagement depth when the connector is loaded by adding metal to the exterior of the outer box part of the connector after tooth engagement.

For small diameter connectors, the problem causing tooth spacing misalignment mentioned in subparagraph a, above, is a result of strain limits of the connector requiring very small teeth with limited engagement and Poisson's effect. When these teeth are forced over one another, the inner pin member goes into compression, which causes a lengthening of the connector pin and teeth. The opposite occurs for the box as it goes into tension, which causes a shortening of the connector box and teeth. The combined effect of the shortening and lengthening causes the teeth to be misaligned so that, when engagement occurs at one end, the teeth at the other end are not yet fully aligned for engagement. This causes the engagement to progress from one end and forces the teeth at the other end to engage. This forced engagement may cause plastic deformation of some teeth, which limits the engagement of the teeth at one end of the connector.

The methods of the present invention enable a better tooth engagement of a small-diameter SCR connector. They provide a method that enables easier expansion of the box, which allows the make-up to be made at lower pressures. The methods of the present invention also provide a means to ensure the teeth are fully engaged and provide stiffness between pin and box to ensure that the teeth do not disengage.

BRIEF DESCRIPTION OF THE SEVERAL VIEWS OF THE DRAWING(S)

FIG. 3 is a cross-sectional depiction of a third embodiment of the invention.

FIG. 3A is a cross-sectional view taken along line 3A-3A in FIG. 3.

FIG. 4 is a cross-sectional depiction of a fourth embodiment of the invention.

Figure 5:
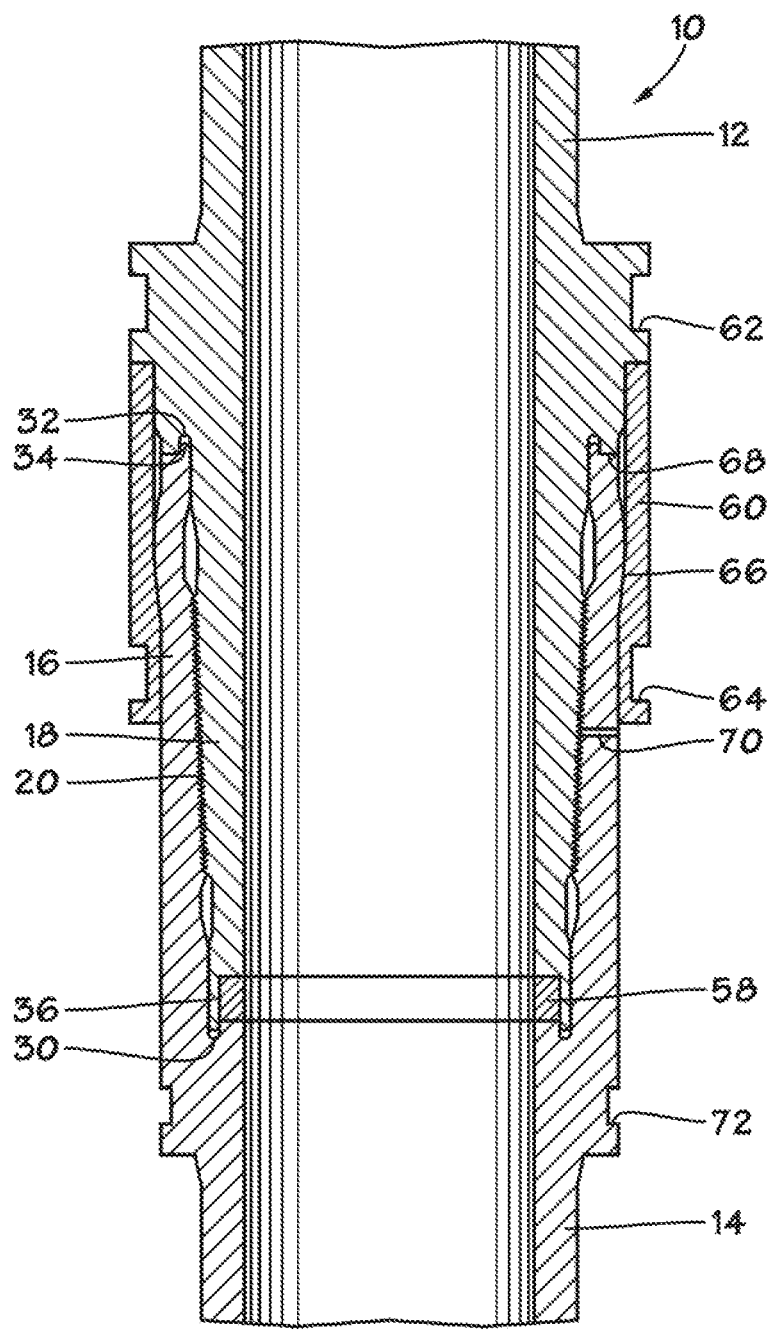
FIG. 5 is a cross sectional illustration of a fifth embodiment of the invention.

FIGS. 6A and 6B sequentially depict one particular method for assembly of the embodiment of the invention shown in FIG. 5.

DETAILED DESCRIPTION OF THE INVENTION

The invention may best be understood by reference to the drawing figures wherein the following reference numbers are used:
10 SCR connector
12 first pipe section
14 second pipe section
16 pin member
18 box member
20 grooved portion
22 pin clamping groove
24 box clamping groove
26 first shoulder abutment
28 second shoulder abutment
30 box annular groove
32 pin annular groove
34 box axially extending tongue
36 pin axially extending tongue
38 radial duct
40 pipe-end box-stretching groove
42 stretching tool
50 external sleeve
52 tapered outer surface on box
54 tapered inner surface on sleeve
56 interference fit
58 annular spacer
60 external sleeve
62 radially extended pin clamping groove
64 sleeve clamping groove
66 tapered section
68 OD shoulder interface
70 radial duct
72 pipe-end box clamping groove
71 sleeve installation tool A pipe connector of the prior art is described in U.S. Pat. No. 5,954,374 to Gallagher, et al. The pipe connector includes a tubular pin member having a generally frusto-conical outer peripheral surface and a tubular box member having a generally frusto-conical inner peripheral surface corresponding to the frusto-conical outer peripheral surface of the pin member and overlies the frusto-conical surface of the pin member when the members are fully engaged together. The members include with inter-engageable annular projections and grooves on the peripheral surfaces for axially locking the members together when they are fully engaged, the projections and grooves being spaced apart along the surfaces. Means are provided for supplying hydraulic fluid under pressure between the overlying parts of the surfaces of the members when fully engaged to expand the box member and/or contract the pin member to bring the projections out of engagement with the corresponding grooves and permit the members to be disengaged.

During make-up of the connection, after the members have been telescoped together to their initial positions, they may be fully engaged by simply applying an axial force to the members. Engagement may be assisted by the application of pressurized hydraulic fluid to the overlapped portions of the surfaces, and the members may be disengaged in the same way, the pressurized fluid expanding the box and/or contracting the pin to permit engagement and disengagement, and lubricating the crest surfaces of the projections and the surfaces between the grooves to facilitate the sliding of these surfaces over one another during make-up of the connection. For this purpose, the box member is provided with a radial duct for connection to a source of pressurized hydraulic fluid. The duct opens inwardly of the box into the region of the frusto-conical surface of the box which is provided with the projections or grooves. To ensure that the hydraulic fluid is able to flow along the full length of the overlapped portions of the surfaces of the members having radially extending the grooves, axial grooves may be provided, at least one in the pin member and the other in the box member, with the duct opening into the groove in the box member.

To help overcome Poisson-effect misalignment, applying more compression to the pin during makeup or tension to the box during make-up brings the teeth into closer alignment. Because the pin is inside the box, it is difficult to directly apply a force to it. The box, however, is accessible and one may physically stretch it to neutralize the Poisson effect. Currently, the make-up of these connectors is accomplished by pushing the connector together from ring grooves at the pipe end of the pin and at the pipe end of the box. The typical arrangement of these ring grooves is depicted in U.S. Pat. No. 5,954,374 to Gallagher et al. In such an arrangement, when the connector is forced together, the axial force used to effect the engagement causes compression in both the pin and box. The compression of the box worsens the tooth misalignment inasmuch as it further compresses the box, shortening the length of the teeth.

There are several methods that may be employed to help equalize the length of the teeth on the pin and box during make-up:

i. Locating the make-up groove on the box at the far box end away from the pipe end. This will cause the make-up force to tension and stretch the box to make it longer. Such a make-up groove on the box end of a connector is illustrated in FIG. 1.

ii. Using the box make-up groove as in subparagraph i, above, placing grease or other viscous fluid in the ID nib groove to create a resistance force to nib entry. The grease or other viscous fluid exits through a nib vent port in the box while creating a resistance that compresses the pin and stretches the box causing the tooth spacing of the pin and the box to be similar. This embodiment is illustrated in FIG. 2 which may optionally comprise a valve or variable orifice on the vent port.

iii. Providing a ring groove at both ends of the box such that a tensioning device may be used to tension the box causing box elongation, which equalizes the tooth length of the pin and the box while the connector is made up. This embodiment is illustrated in FIG. 3.

Figure 1:
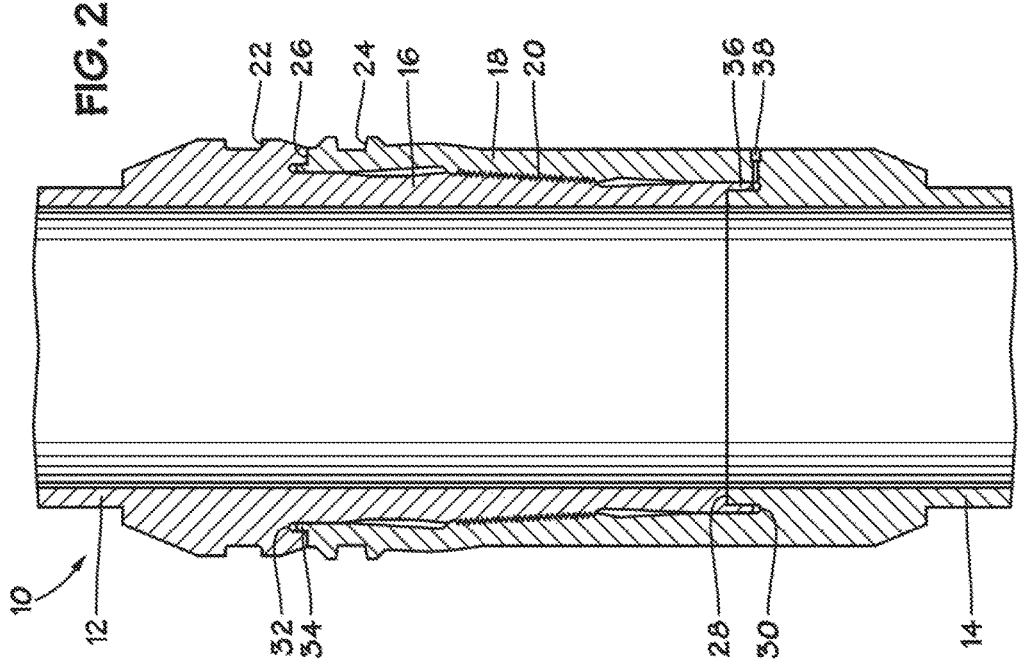
FIG. 1 is a cross-sectional depiction of a first embodiment of the invention.

Referring first to FIG. 1, SCR connector 10 comprises first pipe section 12 having pin member 16 on one end and second pipe section 14 having box member 18 on one end. A grooved portion 20 on each of the pin and box members has teeth (projections) with grooves (depressions) between them that engage with corresponding teeth and grooves on the opposite member to lock the pin and box members together when the joint is fully made up. In an embodiment, the teeth are coaxial, parallel threads and portion 20 is tapered.

Figure 2:
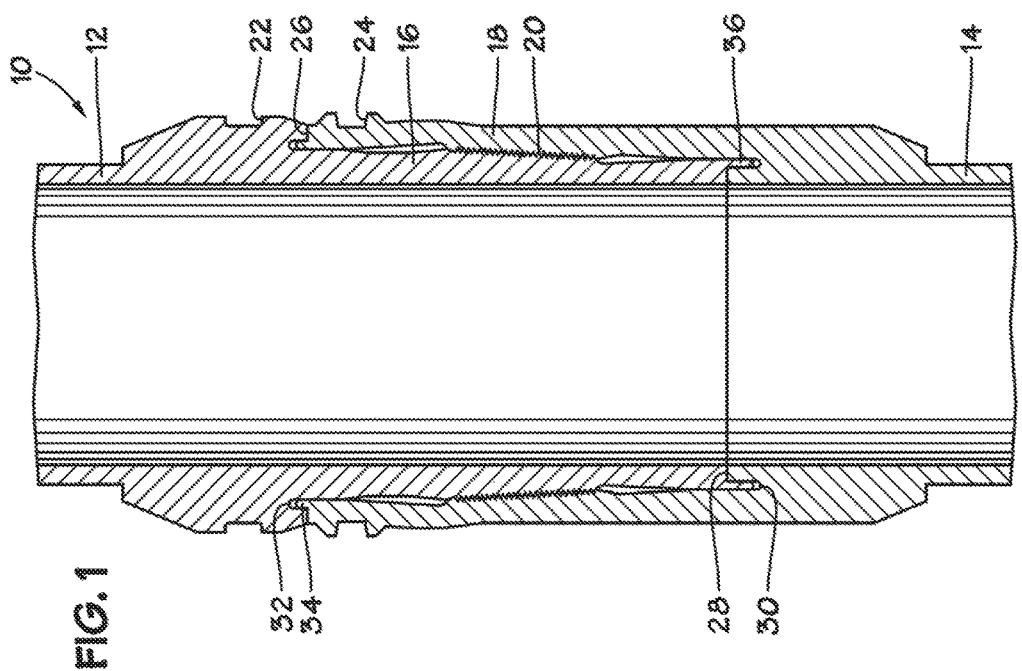
FIG. 2 is a cross-sectional depiction of a second embodiment of the invention.

In the embodiments illustrated in FIGS. 1 and 2, pin member 16 is equipped with pin clamping groove 22 conventionally located near the pipe end of the pin member. However, box clamping groove 24 is unconventionally positioned at the open end of box member 18 so that a tensile force applied by a joint make-up tool between pin clamping groove 22 and box clamping groove 24 will tend to axially stretch box member 18.

When the joint is fully made up, the two joint ends axially abut at first shoulder abutment 26 and second shoulder abutment 28. To ensure a fluid-tight seal, box annular groove 30 and pin annular groove 32 may be provided together with corresponding box axially extending tongue (or projection) 34 and pin axially extending tongue (or projection) 36 which may have interference fits with grooves 30 and 32, respectively, as is more fully described in U.S. Pub. No. 2014/0265320.

As illustrated in FIG. 2, box member annular groove 30 may be provided with radial port 38 which is in fluid communication with an exterior surface of box member 18. During joint make up, grease or other fluid (which may be a viscous fluid) may be placed in groove 30. When axially extending projection 36 on pin member 16 is inserted in groove 30 the fluid provides resistance thereby compressing pin member 16. Duct 38 provides a controlled rate of fluid discharge from groove 30, preventing a hydraulic lock condition that might make full joint make up impossible. In certain embodiments, radial duct 38 may be provided with a valve, an orifice, or a selectable orifice to provide a certain desired rate of fluid discharge during joint make up.

Referring now to FIGS. 3 and 3A, another embodiment is illustrated wherein pin member 18 is additionally provided with pipe-end box-stretching groove 40. Stretching tool 42 engages open-end box-stretching 24 and pipe-end box-stretching groove 40 to apply a separating force between grooves 24 and 40 (as indicated by the arrows in FIG. 3) thereby stretching box member 18 during joint make up.

Another method according to the invention for improving tooth engagement and managing the stresses of these small diameter connector teeth is to add steel to the box outer diameter after make-up. A problem experienced with these small connectors when subject to large tensile or bending loads is that the hoop forces generated by the flank angle of the teeth create radial forces that compress the pin and expand the box. These radial forces may cause a wider separation between the pin and the box members thus reducing the tooth engagement. This reduction in engagement increases the tooth stress and may cause the teeth to slip and disengage.

One possible solution to this problem might be increasing the wall thickness of the pin and box members. However, such increased thickness would make it more difficult to expand and contract the box and pin and would increase the tooth loading during make-up. Inasmuch as the make-up tooth loading may already be approaching a limit, increasing the wall thicknesses is not a viable option, as it would require much higher pressures to make up the connector. These pressures would not be safe to use in the field during assembly. Higher strength steel materials also provide no help inasmuch as the material stiffness remains the same, resulting in the same relative pin-to-box deformations.

A positive method for ensuring good tooth engagement both in make-up and during connector operation is reducing the box thickness and adding additional steel to the outer diameter of the box once the teeth have been made up. This method helps in several ways, as it first makes the box member easier to expand and to stretch during make-up using one of the three methods described above. This reduction in box member thickness allows a reduction in the make-up pressure, as it is easier to expand and also to stretch with the make-up force of the methods described above. One may also use a thinner, higher strength steel for the box member that has the capability to expand further in hoop with a lower pressure.

Once the connector has been made-up, a prepositioned outer shell (or sleeve) with a conical interface may be slipped into place on the thinner box. This extra steel may have a tight or compressive fit on the box so as to stiffen the box sufficiently to minimize any potential for expansion causing a problem with lack of tooth engagement. The extra steel may also be sized and configured to compress the box onto the pin thus increasing tooth engagement. This embodiment is illustrated in FIG. 4 wherein external sleeve 50 is shown installed on tapered outer surface 52 on box member 18. Tapered inner surface 54 on sleeve 50 provides an interference fit 56 with outer surface 52 when fully seated radially opposite grooved portion 20 of connector 10. As shown in dashed lines in FIG. 4, sleeve 50 may be pre-positioned on box member 18 prior to joint make up.

In certain embodiments, the extra steel placed on the box is not prepositioned on the connector. Rather, it comprises a separate shell fastened onto the box using means that secure it in intimate contact or compression. This member may also be wound or affixed onto the box in any way that results in a significant hoop stiffening of the box.

As disclosed in U.S. Pub. No. 2014/0265320, in a pipe joint where two pipe sections have engaged pin and box members, the joint ends are substantially sealed to each other by a sealing surface on one pipe section that substantially abuts a sealing surface on the other pipe section. In one joint, a ring-shaped cutout may formed in a first pipe section and a ring-shaped spacer (58 in FIGS. 5, 6A and 6B) is located in the cutout. The spacer may be chosen from several that have slightly different lengths so the spacer end contacts the corresponding sealing surface. The joint can be pressurized by a fluid (liquid or gas) directed through a port (70 in FIG. 5), which radially compresses the pin member and which radially expands the box member, thereby easing the threads over one another.

Referring now to FIG. 5, an external sleeve 60 may be installed on the pin and box connector assembly with a tapered section that preloads the box connector radially and also axially restrains the pin connector. The sleeve may be axially located on the pin using a press fit or helically threaded onto the external surface of the pin below the outside diameter (OD) shoulder. The external sleeve may also have a surface projection that positively engages a groove on the pin connector side during make-up.

The external sleeve 60 may be equipped with clamping groove 64 similar to groove 62 on pin connector 18. The pin clamping groove 62 may be moved out radially to accommodate this.

The external sleeve design may have surface features (by either material addition or removal) designed to seal against the pin and box connector and keep seawater away from their OD interface 68. Elastomeric O-ring type seals may also be used as part of the design to keep seawater out of the OD shoulder interface.

The external sleeve may be installed over the box connector and axially restrained on the pin connector providing resistance to load and relative axial displacement between the pin and the box and improvement of the OD shoulder preloads capacity of the connector as well as the tooth engagement between the pin and box connector.

The external sleeve may be installed and disassembled with the same tooling as required for assembling the pin and box connectors. No additional tooling is required. The assembly sequence is illustrated sequentially in FIGS. 6A and 6B.

In an embodiment, the sleeve is threaded onto the box. In yet another embodiment, the sleeve is split and clamped onto the box.

In certain embodiments, the sleeve compresses the box onto the pin thereby providing greater tooth engagement in both loaded and unloaded conditions.

The foregoing presents particular embodiments of a system embodying the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A pipe connector comprising:
    a tubular pin member having a generally frusto-conical outer peripheral surface, a free end, and a pipe end opposite the free end and connected to a pipe segment;
    a tubular box member having a generally frusto-conical inner peripheral surface, a free end, and a pipe end opposite the free end, the inner peripheral surface corresponding to the frusto-conical outer peripheral surface of the pin member and overlying the frusto-conical surface of the pin member when the pin member and the box member are fully engaged together, the pin and box members having inter-engagable, annular, radial projections and grooves on the peripheral surfaces sized and configured to axially lock the members together when the pin member and the box member are fully engaged;
    a circumferential groove on an outer surface of the box member proximate the free end;
    an annular axial projection on the free end of the pin member;
    an annular groove on the free end of the box member sized and configured to provide an interference fit with the annular axial projection on the free end of the pin member when the pin and box members are fully engaged;
    a radial port in the box member providing fluid communication between the annular groove and an exterior surface of the box member; and
    a variable orifice on the radial port in the box member.

2. The pipe connector recited in claim 1, further comprising a circumferential groove proximate the pipe end of the pin member sized and configured to engage a make-up tool connected to the circumferential groove on the outer surface of the box member proximate the free end.

3. The pipe connector recited in claim 1, wherein the inter-engagable annular projections and grooves on the peripheral surfaces are axially aligned.

4. The pipe connector recited in claim 1, further comprising: a port configured for supplying hydraulic fluid under pressure between the overlying parts of the surfaces of the members when fully engaged together to at least one of expand the box member and contract the pin member so as to bring the projections out of engagement with the corresponding grooves and permit the members to be disengaged.

5. A method for connecting two pipe segments comprising:
    providing the pipe connector according to claim 1;
    axially stretching the box member while inserting the pin member into the box member.

6. The method recited in claim 5, wherein stretching the box member is accomplished using a tool engaged to the circumferential groove on the outer surface of the box member proximate the free end and to the pin member which compresses the pin and box members together.

7. A method for connecting two pipe segments, the method comprising:
    providing the pipe connector according to claim 1;
    placing a fluid in the annular groove on the free end of the box member; and
    axially compressing the pin member while inserting the annular axial projection on the free end of the pin member into the annular groove on the free end of the box member, by limiting the flow rate of the fluid through the variable orifice on the radial port.

8. The pipe connector recited in claim 1, further comprising:
a second circumferential groove on the outer surface of the box member proximate the pipe end.

9. A method for connecting two pipe segments, the method comprising:
providing the pipe connector according to claim 8; and
axially stretching the box member by axially applying a separating force between the circumferential groove on the outer surface of the box member proximate the free end thereof and the second circumferential groove on the outer surface of the box member proximate the pipe end thereof while inserting the pin member into the box member.

10. A pipe connector comprising:
a tubular pin member having a generally frusto-conical outer peripheral surface, a free end, and a pipe end opposite the free end and connected to a pipe segment;
a tubular box member having a generally frusto-conical inner peripheral surface, a free end, and a pipe end opposite the free end, the inner peripheral surface corresponding to the frusto-conical outer peripheral surface of the pin member and overlying the frusto-conical surface of the pin member when the pin member and the box member are fully engaged together, the pin and box members having inter-engagable, annular, radial projections and grooves on the peripheral surfaces sized and configured to axially lock the members together when the pin member and the box member are fully engaged;
a circumferential groove on an outer surface of the pin member proximate the pipe end;
a circumferential groove on the outer surface of the box member proximate the pipe end; and
a tubular sleeve having a circumferential groove on an outer surface thereof proximate a first end thereof and axially aligned with the circumferential groove on the outer surface of the pin member, the sleeve sized and configured to axially slide on the outer surface of the box member to abut a shoulder on the outer surface of the pin member and cover an axial juncture between the pin member and the box member.

11. The pipe connector recited in claim 10, wherein the circumferential groove on the outer surface of the tubular sleeve, the circumferential groove on the pin member, and the circumferential groove on the box member are sized and configured such that a single clamping tool is configured to be used to axially compress the pin and box members together into engagement and subsequently axially slide the tubular sleeve towards the circumferential groove on the pin member.

12. The pipe connector recited in claim 10, wherein the tubular sleeve has a tapered section on an inner portion thereof.

13. The pipe connector recited in claim 12, wherein the box member has a tapered section that has an interference fit with the tapered section on the tubular sleeve.

14. The pipe connector recited in claim 10, wherein the sleeve provides a fluid-tight seal between the juncture between the pin and box members.

\* \* \* \* \*